March 23, 1971  T. O. PAINE, ACTING  3,572,089
ADMINISTRATOR OF THE NATIONAL AERONAUTICS
AND SPACE ADMINISTRATION
PEAK ACCELERATION LIMITER FOR VIBRATIONAL TESTER
Filed Feb. 4, 1969  2 Sheets-Sheet 1

CARL P. CHAPMAN
INVENTOR.

BY
ATTORNEYS.

CARL P. CHAPMAN
INVENTOR.

United States Patent Office 3,572,089
Patented Mar. 23, 1971

3,572,089
PEAK ACCELERATION LIMITER FOR
VIBRATIONAL TESTER
T. O. Paine, Acting Administrator of the National Aeronautics and Space Administration, with respect to an invention of Carl P. Chapman, La Crescenta, Calif.
Filed Feb. 4, 1969, Ser. No. 796,405
Int. Cl. G01m 7/00
U.S. Cl. 73—71.6
6 Claims

ABSTRACT OF THE DISCLOSURE

An electronic detection and protection system is provided for use with vibrational or dynamic testing apparatus for qualification of an object such as a spacecraft component, and for preventing damage to the object during testing. The system responds to peak accelerations of either polarity above a predetermined amplitude threshold, as perceived by tranducer means mounted on the object under test, to institute control effects such as deactivating the test apparatus or actuating alarm indicators, or both. The system also responds to the true root mean square current of the alternating current exciting signals flowing in the electrical drive of the test apparatus whenever a predetermined amplitude threshold is exceeded to initiate the same control effects so as to protect the electrical drive.

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Spacecraft and spacecraft components such as solar panels for example, are routinely subjected to vibrational testing to ensure that such articles will be qualified for flight and capable of withstanding stresses which will actually be applied or encountered during the mission. Meaningful testing requires that simulation of the applied forces be at levels which it is expected will actually be encountered. On the other hand, it is desirable to limit the test stresses to safe levels established by the qualification authority to avoid needless destruction or weakening of the test article.

Vibrational testing is performed by mounting the article on a device termed a shake table or by applying the output of a shaker to some portion of the article to be tested, and applying an electrical excitation to the table or shaker to produce mechanical movement of the article of a vibrational nature. The levels of vibration actually induced in the article are montored by accelerometers whch are sensors that produce an electrcal output in accordance with accelerations induced in the test article. A number of accelerometers are positioned at various places on the test article and their outputs are monitored by means of electronic equipment. The latter equipment produces indications of the vibrational forces perceived at the various accelerometer positions on the article. Such indications may be transitory in that they may be displayed transiently on an oscilloscope, or they may be permanently recorded graphically by an oscillograph or recorded as electrical signals of either analog or digital form magnetically or otherwise, for subsequent study and analysis.

Occasionally the stress level induced in the test article by the vibrational exciter exceeds safe structural limits. Normally the arrangement for vibrational testing includes degenerative feedback loops from each accelerometer channel back to the signal source to effect limitation of amplitude of the mechanical excitation of the test article. However, the time constant of such loops must be relatively long to avoid continual hunting occasioned by too rapid response to transitory peak accelerations regardless of their level which may be below the predetermined threshold.

Transient peak accelerations may be either positive-going or negatively-going and such excursions may have a waveform which is not necessarily symmetrical about the zero axis of acceleration. One excursion may be well below the critical level while the other may be far above the critical level. On average, the amplitude could be within the maximum test specification, yet the test article could sustain structural damage. It is therefore desirable to discontinue the test when accelerations of such magnitude, regardless of polarity, occur and to call to the attention of the test operator that the preset threshold level has been exceeded so that remedial action can be taken.

The protective system of the present invention therefore supplements the action of the conventional feedback loop control of the vibrational excitation system. To cope with very short peak accelerations, it has a very short time constant so that response to such undesired transients is almost instantaneous. The signals developed by the accelerometers are continuously monitored by the protective system to detect such peak accelerations, and when unsafe levels are sensed in any accelerometer chanenl, regardless of polarity, control equipment is actuated which automatically deactivates the vibrational excitation system to suspend further testing to prevent damage, and simultaneously, either visual or audible alarms, or both may be given.

Occasionally, it has been found that although such peak acceleration threshold levels are not exceeded as sensed by the accelerometers, the excitation current supplied to drive the armature of the shake table or shaker may exceed a safe limit for the armature. The same control equipment is automatically actuated to deactivate the vibrational excitation system to prevent damage to the armature. The present invention therefore includes an additional protective arrangement which monitors current supplied to the shaker armature for this purpose.

SUMMARY OF THE INVENTION

The protective system of the present invention includes a fast acting switching circuit which responds to transient signals from accelerometers coupled to the article being tested, to produce control effects whenever such signals exceed a pre-established level. The signal from each accelerometer is applied to its respective absolute value network to convert both positive-going and negative-going peaks to the same polarity. Signals from the absolute value network in excess of a pre-established threshold trigger a silicon controlled switch, which actuates a relay to discontinue the test and simultaneously to actuate alarms. Another portion of the protective system monitors the true RMS armature current in the vibration exciter unit to supply a trigger signal for the silicon controlled switch, so as to deactivate the exciter when a pre-established armature current value is exceeded.

BRIEF DESCRIPTION OF THE DRAWINGS

FIG. 3 illustrates two short trains of representative vibrational waveforms typically issuing from any of the accelerometer channels, the form of such trains after processing by the absolute value network, and an indication of one representative predetermined threshold level which causes operation of the protective system.

DETAILED DESCRIPTION OF THE ILLUSTRATED EMBODIMENT

Figure 1:
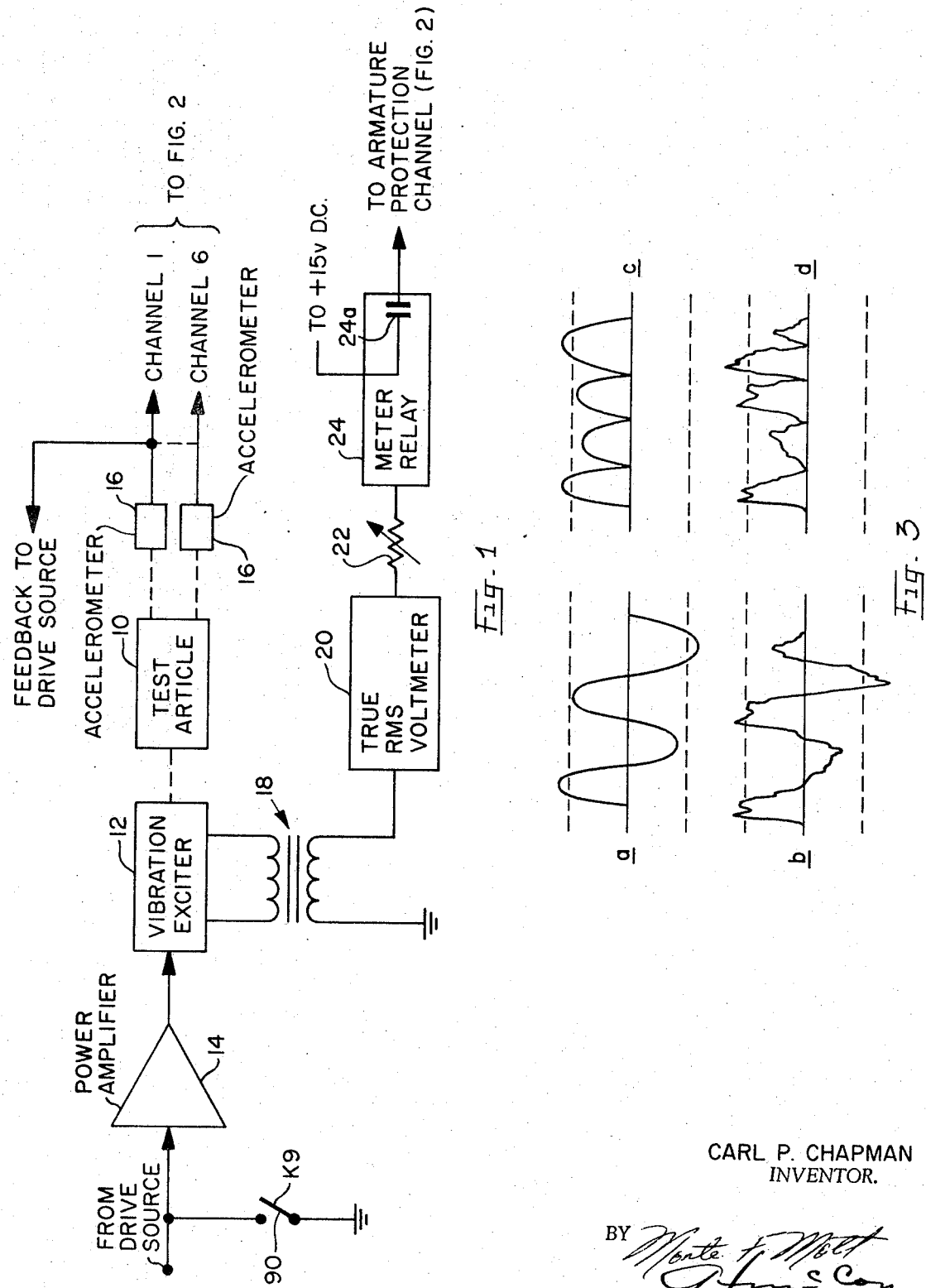
FIG. 1 is a block diagram showing a system for deriving monitoring signals from an article being vibrated, for use in the protective system of the invention.

As shown in FIG. 1, test article 10 is subjected to vibrational testing by means of vibration exciter 12 which may be either a shake table or a shaker applied to the object. Drive for exciter 12 is supplied from an appropriate sine wave or noise generator through power amplifier 14. The input signal to the power amplifier 14 may be shorted out by closing the normally open, mercury wetted, contacts of a relay K9 as will subsequently be described.

Accelerometers 16 may be mounted on article 10, or on the bracket which couples the article to the vibration exciter. Any appropriate number of accelerometers 16 may be used to produce output signals on separate channels numbered, for example, from #1 to #6. The output signals from the various channels are applied to the control circuits of FIG. 2, as will be described.

Figure 2:
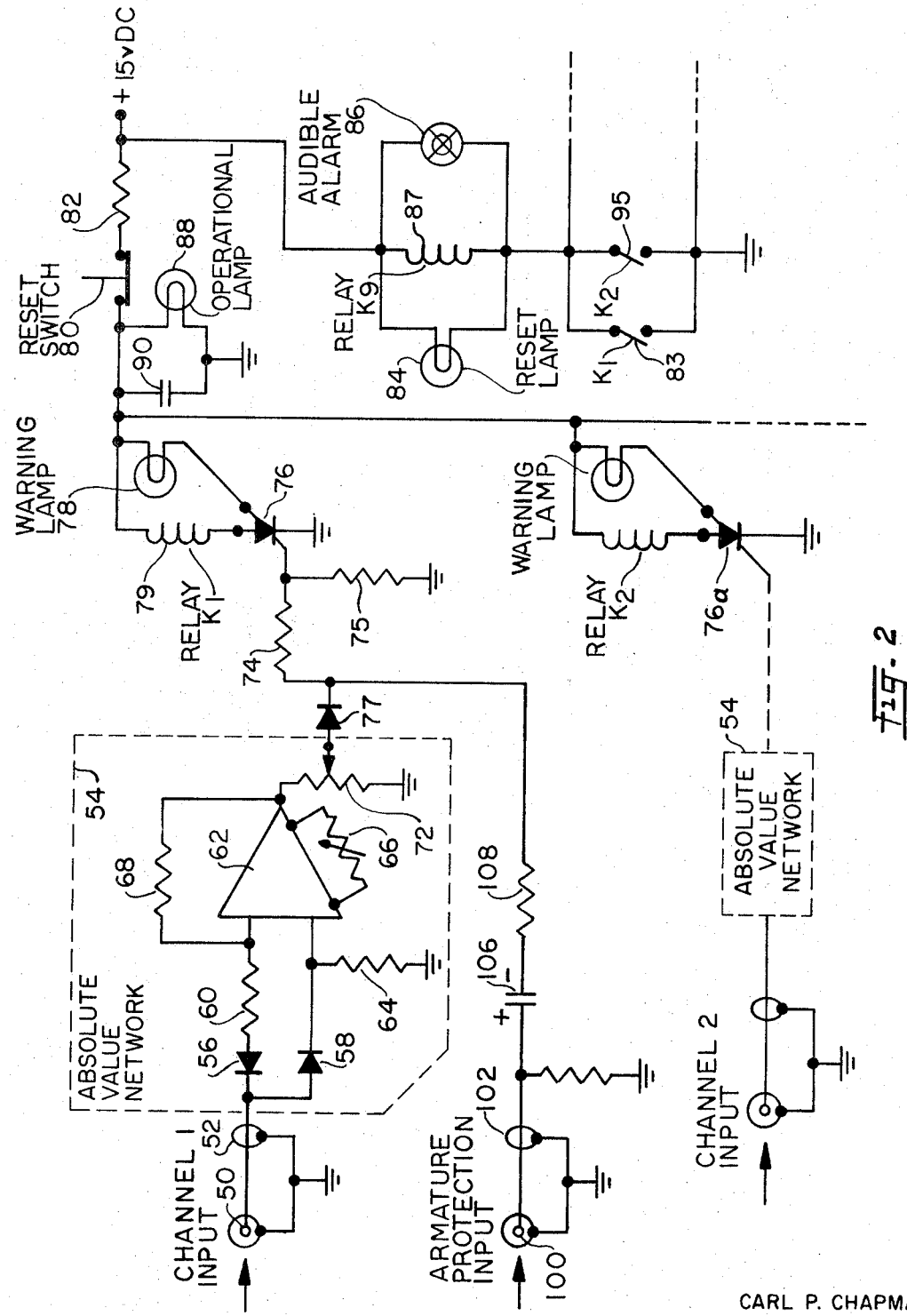
FIG. 2 is a diagram, partly in block form and partly in circuit detail, showing one embodiment of an improved protective system constructed in accordance with the concepts of the invention.

The output of each accelerometer channel is fed, as shown typically for channel #1 in FIG. 2, through shielded cable 52 to an absolute value network 54, indicated within broken lines on the drawing. The network is made up of diodes 56 and 58, operational amplifier 62, and associated resistors 60, 64, 66 and 68. Shielded cable is used for each of the input lines to prevent stray pickup from sources other than the accelerometers. This eliminates the possibility of development of unwanted trigger signals from spurious sources.

Signals produced in the accelerometers by mechanical vibration of the test article may have the sinusoidal wave shape shown in area $a$ of FIG. 3 if sine wave excitation is employed, or the shape shown in area $b$ if noise excitation is used. It will be noted that some portions of each signals are positive-going and that some portions are negative-going with respect to the zero axis, but that succeeding portions are not necessarily centered about that axis, and that some portions have amplitudes less than the threshold level indicated by the broken lines parallel to the zero axis on both sides of the axis, and that some portions have amplitudes greater than the level indicated by the broken lines. The object is to detect those portions exceeding the broken line levels regardless of polarity.

Although it is not strictly necessary for detection purposes to convert the negative-going portions to positive-going portions as is disclosed herein, this approach enables the simplified detection system shown herein to be used, at a considerable savings in cost. It is the purpose of the absolute value network to convert the negative-going portions to positive-going portions, while preserving the original waveform without distorting the amplitude of either portion of the signal.

Diode 56 is connected so that it passes negative-going portions of the incoming accelerometer signal to the inverting input; designated by the minus sign, of operational amplifier 62, and diode 58 is connected so that it passes positive-going portions to the non-inverting input designated by the plus sign. The protective system is thus responsive to either negative-going or positive-going peak accelerations which exceed the threshold level set by the test engineer.

Amplifier 62 is operated with heavy degenerative feedback, and is capable of low direct current drift and good output linearity. It also provides high output impedance to diodes 56 and 58, and low output impedance to drive the sensing and switching circuits as subsequently described. Amplifier 62 may be a NEXUS type SQ10A or any suitable equivalent having similar characteristics and capabilities.

Resistor 68 is the conventional feedback resistor for any operational amplifier, and resistor 60 is the source resistor which together with the feedback resistor sets the gain for the amplifier in the relationship $R_f/R_s = \text{gain}$. In this particular instance, the resistors have the same value, namely 10 kilohms, which fixes the gain at unity. Variable resistor 66 of 50 kilohms value, is a trimmer to balance amplifier output to zero when the input is zero. Resistor 64 is of 10 kilohm value, the same as resistor 60, so that the amplitude of inverted negative-going portions of the signal will closely approximate the level of positive-going portions of the signals for equal inputs, after passage through the absolute value network and before being applied to the peak sensing detector.

The output of absolute value network 54 is fed to potentiometer 72, the level setting control which establishes the desired maximum threshold for operation of the protective system. The portion of the output picked off by the slider of the potentiometer is fed through diode 77 to a voltage divider made up of resistors 74 and 75, each of which is typically 562 ohms. Diode 77 increases the sensitivity of the trigger circuit made up of 72, 77, 74 and 75 by preventing triggering of the sensing detector by any output offset voltage from the operational amplifier 62. Because contact bias developed by the diode must be overcome, in effect it sets a minimum trigger level. The voltage divider made up of resistors 74 and 75, halves the output of the amplifier 62 and potentiometer 72 for application to the sensing detector.

The sensing detector is silicon controlled switch 76 which for example may be a 3N81 type. This type was chosen because it can be triggered on its cathode gate by inputs as small as one milliampere and having a duration as short as only one microsecond. This characteristic provides an extremely fast response to peak accelerations. This switch sustains avalanche conduction in the anode-cathode circuit after triggering which cannot be interrupted by any further positive signal applied to its cathode gate. Conduction can be stopped only by interrupting the supply voltage.

A positive-going output exceeding the level set by potentiometer 72 appearing on the cathode gate of switch 76 will thus trigger the switch to full conduction. Since coil 79 of control relay K1 is in the anode circuit of the switch, the coil will be energized to close normally open contacts 83 whenever the switch is triggered. Closing of contacts 83 establishes a circuit from ground through coil 87 of relay K9 to the other side of the supply, energizing relay K9 and closing its normally open contacts 90 (see FIG. 1) to short out the input to power amplifier 14 which deactivates vibration exciter 12. Although triggering of switch 76 occurs in as little as a microsecond, the time lags inherent in operation of the relays is sequence, retard deactivation of exciter 12 to about 2 milliseconds, although it may take as long as 40 milliseconds for the exciter to become motionless. Despite this, the arrangement affoards satisfactory protection of the test article against excessive peak accelerations having periods as short as one microsecond. As mentioned, relay K9 may have mercury wetted contacts, operating in conjunction with relay K1 which preferably is a reed type relay.

Whenever coil 79 of relay K1 is energized, lamp 84 and audible alarm 86, both of which are connected in parallel with coil 87, are also energized to give visual and audible indications that some peak acceleration has tripped the protective system. Operational lamp 88 glows whenever the power supply is connected to the system to indicate that it is in "go" condition.

As mentioned, once current flow is established in the switch, the flow can only be interrupted by disconnecting the supply source. This is effected by depressing reset switch 80 which is of the momentary, normally closed type. Capacitor 90 and resistor 82 suppress transients produced on opening of switch 80 to prevent spurious operation of the switch. Their values are respectively 10 microfarads and 10 ohms.

Although switch 76 has been specified as a silicon controlled switch which also has an anode gate which is not utilized for gating purposes, it is to be understood that this switch was chosen because of its extremely fast response time and its latching characteristic. Any other type of switch whether solid state, thermionic or mechanical having suitable response and latching characteristics would be suitable for use. The anode gate of the switch is utilized to effect illumination of warning lamp 78 which glows when the switch is fired because sufficient current can flow in the anode-gate-cathode circuit to light up a type 327 lamp from the 15 volt supply.

A similar signal from a second accelerometer 16 in the system of FIG. 1 may be received by the channel 2 input of the circuit of FIG. 2, so as to trigger a similar silicon controlled switch 76a. Likewise, other signals may be received on other channels, each being associated with a corresponding silicon controlled switch. When the switch 76a is triggered, relay K2 is energized to close the normally-open K2 relay contacts 95 in the circuit of the elements 84, K9 and 86 and initiate the same control effects. Likewise, other inputs, when they act to trigger their corresponding silicon controlled switches, cause corresponding relay contacts in the circuit of the aforesaid elements 84, K9 and 86 to close to initiate the same control effects.

As mentioned above, the protective system may also be used to monitor true RMS armature currents in vibration exciter 12 as shown in FIG. 1. When exciter 12 is energized, a certain level of current flows in its armature. This current is made to flow through the primary winding of current transformer 18 which produces a voltage across its secondary winding proportional to the current flowing in its primary winding. Current transformer 18 may be a model TCT 301 made by Pierson Company, which develops ten millivolts across the secondary winding for each ampere flowing in its primary winding. The secondary winding of transformer 18 is connected to a true root-mean-square converter and voltmeter 20 which may be a Hewlett-Packard Model 3400A or equivalent.

The alternating current which flows in the armature of exciter 12 is of such complex nature that it cannot be measured by ordinary instruments because the net effect of excursions on both sides of the zero axis is a cancellation. Thus true armature current cannot be ascertained by any type instrument other than this which converts the complex current to heat and develops an output D.C. voltage proportional thereto. Although this meter indicates zero to one volt, the scale can be calibrated to indicate armature current which ranges in the neighborhood of one thousand amperes. Because of this thermal conversion, there is a time lag of approximately one second in the output response of this meter, and hence in monitoring the armature current. Although a faster response would be desirable, this time lag is adequate to ensure protection of the armature.

The direct current output of converter 20 is applied through adjustable resistor 22, which may have a value of 20 kilohms, to meter relay 24 which may be a Weston type 1075 or a Simpson model 3324XA (catalog No. 16451). Meter relay 24 not only indicates the magnitude of the input on its dial by movements of its pointer, but the pointer also interrupts a light beam to a photocell to operate a circuit to close a pair of relay contacts designated 24a in FIG. 1. The position of the light beam with respect to the dial face can be varied by moving an arm, and thus the beam can be broken at any desired position on the dial by moving the arm. The threshold for control of armature current can thus be set by the test engineer. The dial may be calibrated in units representative of the actual armature current. The protective control signal is developed as follows.

When the meter relay contacts close, they connect input 100 (see FIG. 2) to the positive side of the 15 volt supply. The inrush charging current to capacitor 106, through the charging circuit including resistors 108, 74 and 75 produces a short, positive-going pulse at the junction of diode 77 and resistor 74 which is sufficient to trigger the cathode gate of switch 76. Resistor 74 may have a value of 10 kilohms, capacitor 106 may have a value of 6.8 microfarads and resistor 108 may have a value of 1.2 kilohms. Capacitor 106 blocks the D.C. supply voltage from being applied to the cathode gate of switch 76.

Thus when the armature current exceeds the level set by the test engineer by moving the contact on meter relay 24, a single momentary signal is produced which is fed into the armature protection input 100 to trigger switch 76 to initiate the same control effects, independently of other signals from any of the accelerometers.

The protective system of the invention is advantageous in that it is inherently simple in its concept and construction. Yet, the system is capable of precisely monitoring outputs from accelerometers or other sensors associated with the monitored test article to provide the desired control effect on an almost instantaneous basis, when such outputs exceed preset safe limits.

The invention provides, therefore, an exceedingly simple and starightforward protective system which may, for example, be used in conjunction with vibration test apparatus, to assure that the article being tested is not vibrated beyond its structure capabilities. Also, the protective system may be used to monitor the armature current in the vibrational test exciter and to deactivate the test apparatus should the armature current exceed a preset threshold.

The protective system has utility outside the testing laboratory. For example, it may be used in aircraft, or other vehicles, to provide a visual or audible alarm whenever accelerations at any monitored location within the vehicle exceed a predetermined safe limit. The protective system may also be used in industry for many applications, such as, for example, protection of automatic control systems associated with automated assembly lines. In general, the protective system of the invention finds utility in any environment in which vibrational accelerations must be maintained below certain preestablished limits.

What is claimed is:

1. In a vibrational testing system including a drive source, a vibration generating exciter driven by said source and mechanically coupled to the article under test for generating vibrations in response to alternating electric current provided by said drive source, an acceleration-responsive sensing means mechanically coupled to the article under test and adapted to sense acceleration forces attendant to the article for developing an output signal proportional to such accelerations, and a degenerative feedback loop connected from said sensing means to the drive source for controlling the amplitude of vibrational excitation applied to the article under test; protective means to prevent damage to the article comprising:

a fast acting switching circuit coupled to said drive source for selectively deactivating said drive source;

a second loop including level setting means for setting the level for actuation of said fast acting switching circuit, said second loop being connected from said sensing means to said fast acting switching circuit for feeding the output signal from the sensing means to the fast acting switching circuit for actuating the fast acting switching circuit to deactivate the drive source whenever the signal exceeds a set level;

a root-mean-square current converter coupled to said exciter for producing a direct current proportional to the exciter energizing current; and circuit means, coupled between said current converter and said switching circuit, for initiating operation of said switching circuit whenever said direct current exceeds a set threshold.

2. Protective means in the vibrational testing system according to claim 1, in which the degenerative feedback loop has a relatively long time constant so that amplitude control of vibrational excitation applied thereby to the article under test is not responsive to short duration peak accelerations of the article regardless of level; and in which the second loop has a relatively short time constant which is responsive to short duration peak accelerations.

3. Protective means according to claim 2, in which the accelerations sensed by said sensing means have both positive-going and negative-going polarities causing said sensing means to develop an output signal with bi-polar peaks, and in which said second loop includes means for converting the bi-polar peaks of said output signal to a further output signal with unipolar peaks without affecting the original amplitude of the aforesaid bi-polar peaks.

4. Protective means in accordance with claim 2, in which the fast acting switching circuit includes a solid state latching device for holding the drive source in a deactivated condition until said switching circuit is reset.

5. Protective means according to claim 4, in which the solid state latching device also activates an alarm.

6. Protective means for use with a vibrational testing system according to claim 1, in which said second loop includes an absolute value network including a unity gain operational amplifier.

References Cited
UNITED STATES PATENTS

| | | | |
|---|---|---|---|
| 2,844,777 | 7/1958 | Ross | 318—127 |
| 2,935,671 | 5/1960 | Ross | 318—128 |
| 3,011,354 | 12/1961 | Ireton et al. | 73—71.6X |
| 3,056,910 | 10/1962 | Hajian | 318—128 |
| 3,462,999 | 8/1969 | Fultz et al. | 73—71.6 |

JAMES J. GILL, Primary Examiner